United States Patent
Basel et al.

(10) Patent No.: US 11,390,524 B2
(45) Date of Patent: Jul. 19, 2022

(54) CARBON POWDERS AND METHODS OF MAKING SAME

(71) Applicant: National Electrical Carbon Products, Inc., Greenville, SC (US)

(72) Inventors: Richard Basel; Richard Clark, Greenville, SC (US); Andrew Joseph Goshe, Greenville, SC (US); Douglas Miller, Greenville, SC (US)

(73) Assignee: National Electrical Carbon Products, Inc., Greenville, SC (US)

(*) Notice: Subject to any disclaimer, the term of this patent is extended or adjusted under 35 U.S.C. 154(b) by 325 days.

(21) Appl. No.: 16/484,558

(22) PCT Filed: Feb. 6, 2018

(86) PCT No.: PCT/EP2018/052914
§ 371 (c)(1),
(2) Date: Aug. 8, 2019

(87) PCT Pub. No.: WO2018/146080
PCT Pub. Date: Aug. 16, 2018

(65) Prior Publication Data
US 2020/0002169 A1 Jan. 2, 2020

Related U.S. Application Data

(60) Provisional application No. 62/456,152, filed on Feb. 8, 2017.

(51) Int. Cl.
*C01B 31/02* (2006.01)
*C01B 32/05* (2017.01)
*C01B 32/318* (2017.01)

(52) U.S. Cl.
CPC ............ *C01B 32/05* (2017.08); *C01B 32/318* (2017.08); *C01P 2004/51* (2013.01)

(58) Field of Classification Search
CPC .................................................. C01B 32/05
See application file for complete search history.

(56) References Cited

U.S. PATENT DOCUMENTS

| | | | |
|---|---|---|---|
| 3,891,574 A | 6/1975 | Kobayashi et al. | |
| 3,909,449 A | 9/1975 | Nagai et al. | |
| 3,953,345 A | 4/1976 | Saito et al. | |
| 4,025,689 A | 5/1977 | Kobayashi et al. | |
| 4,042,486 A | 8/1977 | Asano et al. | |
| 4,045,368 A | 8/1977 | Katori et al. | |
| 4,273,675 A | 6/1981 | Shiiki et al. | |
| 4,275,051 A | 6/1981 | Barr | |
| 4,371,454 A | 2/1983 | Hisatsugu et al. | |
| 4,420,443 A | 12/1983 | Kaji et al. | |
| 4,883,617 A * | 11/1989 | Benn .................... | C04B 35/528 264/29.7 |
| 5,380,594 A | 1/1995 | Von Blucher et al. | |
| 5,472,649 A | 12/1995 | Chang et al. | |
| 5,480,626 A | 1/1996 | Klasen et al. | |
| 5,607,770 A | 3/1997 | Lewis et al. | |
| 5,626,977 A | 5/1997 | Mayer et al. | |
| 5,698,341 A | 12/1997 | Tamaki et al. | |
| 5,898,564 A | 4/1999 | Mayer et al. | |
| 7,148,285 B2 | 12/2006 | Clark et al. | |
| 7,781,370 B2 | 8/2010 | Sonobe et al. | |
| 7,858,239 B2 | 12/2010 | Shimizu et al. | |
| 2008/0063592 A1 | 3/2008 | Nakahara et al. | |
| 2010/0311852 A1 | 12/2010 | Kang et al. | |
| 2012/0286216 A1 | 11/2012 | Zhang et al. | |

FOREIGN PATENT DOCUMENTS

| | | |
|---|---|---|
| CA | 2176452 A1 | 11/1997 |
| CN | 102508416 A | 6/2012 |
| EP | 0456278 A1 | 11/1991 |
| EP | 0776055 A1 | 5/1997 |
| EP | 1296892 A4 | 8/2006 |
| EP | 1743870 A1 | 1/2007 |
| EP | 2913873 A1 | 9/2015 |
| GB | 329652 A | 5/1930 |
| JP | 63089413 A | 4/1988 |
| JP | 4338107 B2 | 10/2009 |

OTHER PUBLICATIONS

PCT International Preliminary Report on Patentability in PCT/EP2018/052914 dated Aug. 13, 2019, 15 pages.
PCT International Search Report in PCT/EP2018/052914 dated Aug. 21, 2018, 3 pages.
Brooks, J.D., et al., "The Formation of Graphitizing Carbons from the Liquid Phase", Carbon (1965), vol. 3, pp. 185-193.
Chang, Young-Chul, et al., "Anodic performances of mesocarbon microbeads (MCMB) prepared from synthetic naphthalene isotropic pitch", Carbon 37 (1999), pp. 1285-1297.
Korai, Y., et al., "Preparation of mesocarbon microbeads by dispersing mesophase pitch in isotropic pitches", Carbon (1997), vol. 35, No. 10-11, pp. 1503-1515.
Lee, Sang-Ick, et al., "Preparation of microporous carbon nanospheres", Carbon 411 (2002), pp. 1645-1687.
Nagarajan, G. S., et al., "A Mathematical Model for Intercalation Electrode Behavior, I. Effect of Particle-Size Distribution on Discharge Capacity", J. Electrochem. Soc. (1998), vol. 145, Issue 3, pp. 771-779.
Norfolk, Christopher, et al., "Processing of mesocarbon microbeads to high-performance materials: Part 1. Studies towards the sintering mechanism", Carbon 42 (2004), pp. 11-19.

(Continued)

*Primary Examiner* — Stuart L Hendrickson
(74) *Attorney, Agent, or Firm* — Servilla Whitney LLC

(57) ABSTRACT

A method for producing carbon powder having a defined carbon particle size distribution comprises the steps of: —a) selecting a carbon precursor powder of a defined precursor particle size distribution, the carbon precursor powder consisting of or comprising particles of one or more meltable carbon precursors; b) treating the carbon precursor powder to round at least some of the particles of the carbon precursor and thereby produce a rounded carbon precursor; and c) carbonizing the rounded carbon precursor; wherein the defined precursor particle size distribution is such that on carbonization the powder of defined carbon particle size distribution is produced.

14 Claims, 3 Drawing Sheets

(56) References Cited

OTHER PUBLICATIONS

Wang, Yong-Gang, et al., "Microstructure of mesocarbon microbeads prepared from synthetic isotropic naphthalene pitch in the presence of carbon black", Carbon 37 (1998), pp. 307-314.

Zhou, Changjun, "The effect of additives and processing conditions on properties of sintered mesocarbon microbeads", Dissertation Notre Dame, IN (2007), 128 pages.

\* cited by examiner

Figure 1:
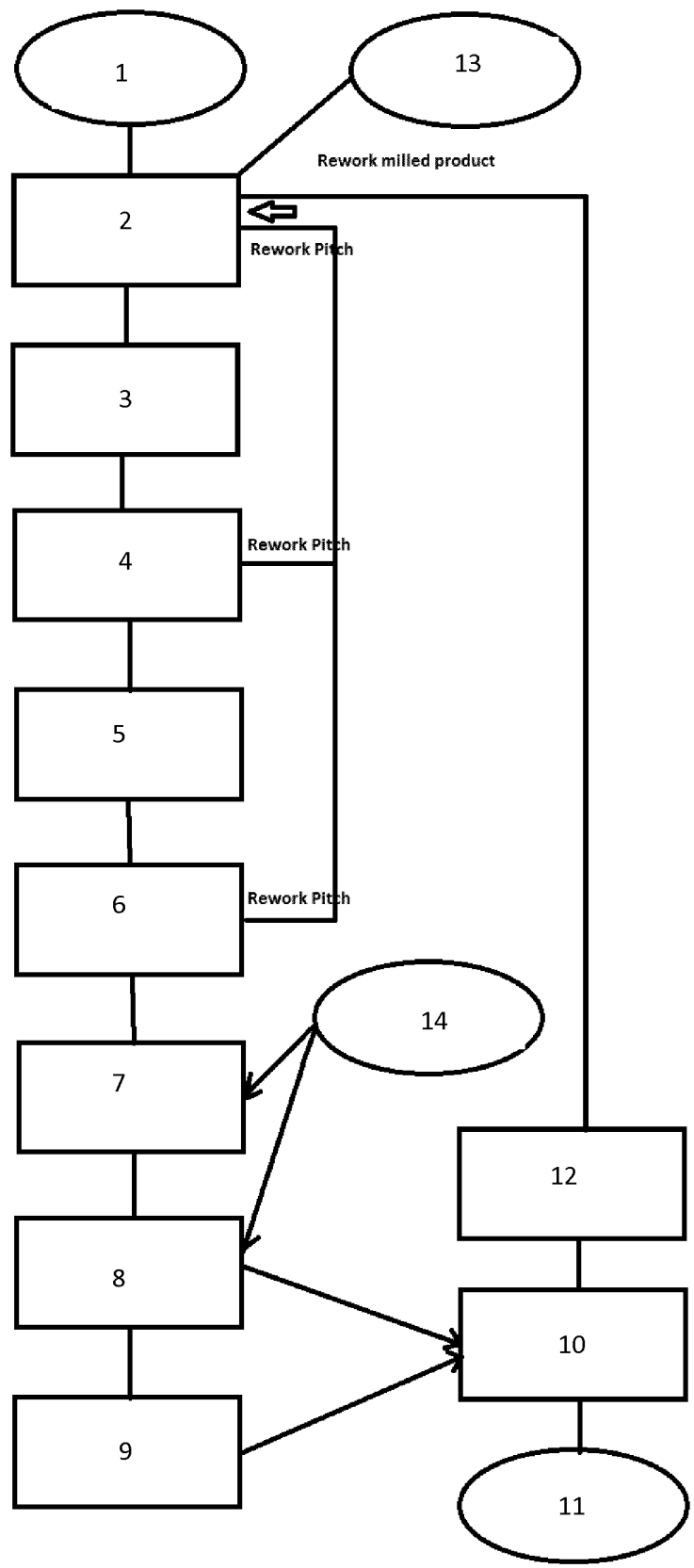

Figure 1 Manufacture of Sized and Rounded Precursors to make Carbon/Graphites.

CARBON POWDERS AND METHODS OF MAKING SAME

CROSS-REFERENCE TO RELATED APPLICATIONS

This application is the National Stage entry of PCT/EP2018/052914, filed on Feb. 6, 2018, which claims priority U.S. Appln. Ser. No. 62/456,152, filed on Feb. 8, 2017, which are incorporated herein by reference in their entireties.

This invention relates to processes and apparatus for making rounded carbon particles of defined size distribution, to the rounded carbon particles, and to applications of the rounded carbon particles.

BACKGROUND OF THE INVENTION

Many types of carbon have been used in the past to produce carbon/graphite powders. Such powders are typically but not exclusively used for catalysis and for electrochemical applications such as in batteries. A current use for carbon/graphite powder is as lithium absorbing materials for use in the electrodes of lithium ion batteries. This invention is not limited to any particular use and extends to any application in which carbon particles of defined particle size distribution is of interest.

One of the issues in making a lithium ion battery or other catalytic surface is the problem of packing and packaging. In lithium ion battery applications, it is useful to use carbons that can be packed very easily and still give good charge/discharge characteristics. To do this, the powder surface area is often kept small, while the tap density and press densities is desirably high. In catalytic applications differing criteria may apply.

This means that carbon materials that are made for many applications must be sized correctly within strict limits to give good performance. In some applications this is best accomplished using two separate particle sizes (Nagarajan, G. S., J. W. Van Zee & R. M. Spotnitz. 1998. J. Electrochem. Soc. 145(3):771-779). The particle configuration affects the press density, tap density and general qualities, for example the absorptive or catalytic properties.

Carbon powder size is thus critical to proper manufacturing of controlled porosity materials, materials used in batteries, and carbon products used for capacitors and other energy storage applications as well as catalytic applications.

For lithium ion and other battery applications graphite particles pose several problems, including their limited capacity and their susceptibility to exfoliation by electrolytes. In such application so called "hard carbon" is preferable and for some applications [sodium-ion and magnesium-ion batteries] may be essential. As well as the high capacity associated with hard carbon (versus that of graphite), hard carbon also allows you to run at a higher voltage than graphite—moving to higher voltages is a significant trend within the lithium ion battery industry.

The present invention lends itself to manufacture of hard carbons, but may be used to produce graphites as well; or even to produce mixtures of hard carbon and graphite to tailor capacity and voltage profile.

It is convenient here to introduce some definitions of terms used in the present specification.

Definitions

"Sphericalization"—a process in which particles are rounded and formed to an aspect ratio [longest axis:shortest axis] of less than 10:1, or less than 5:1, or less than 3:1, or less than 2:1. Aspect ratios may be expressed as two numbers separated by a colon, or as a simple or decimal fraction.

"Nanomaterials"—a material containing particles, in an unbound state or as an aggregate or as an agglomerate and where, for 50% or more of the particles in the number size distribution, one or more external dimensions is in the size range 1 nm-100 nm.

"Stabilization"—a process whereby a pitch or other precursor can be chemically modified so that it will not re-melt when carbonized. This can be considered as chemically cross-linking the material to preserve structural characteristics. i.e. a pitch structure prone to graphitization can be locked in, or one that will not graphitize can be locked in. This is conventionally done with isotropic pitch fibers and with mesophase pitch fibers.

Most carbon and graphite powders are made by milling large lumps of material. The types of mills used are varied but all result in a breaking of the material and a sequential reduction in size. Yet, all milling unit operations are still an imperfect means to make particles of a narrow size distribution and round or rounded shape.

When carbon is milled, it is possible to re-size and re-mill the carbon until particles no larger than the largest desired particle size are obtained. However, a consequence of performing milling and sphericalization (rounding) on a preformed carbon is that particles are formed that are smaller than the required size, as are mis-shaped, non-rounded, particles. Such particles become scrap and raise the cost of production/disposal.

Furthermore, the proper size and aspect ratio are very important to packing and performance of rounded powders. As a consequence, carbon powders for many applications are sphericalized by suitable means.

Alternatively, particles may be rounded before conversion into carbon. Currently used means to smooth the particles and make them approximately round leads to the production of a significant fraction comprising powders less than the desirable size range. In many of these applications, 30-70% of the resultant carbon may be smaller than the proper size or not the right spherical shape.

The manufacture of suitably spherical particles may also be achieved by either spherhericalization at the end of manufacture creating waste, or making agglomerated particles before carbonization.

Coating and agglomeration techniques are known (U.S. Pat. Nos. 3,891,574; 4,371,454; 7,148,285B2; 5,480,626). While it is possible to take smaller particles and re-manufacture agglomerated materials of the proper size range, there are problems with this technology. Not only does this lead to more steps, the process of agglomeration can lead to particles with higher surface areas due to the void volume of the particles being stuck together with materials such as phenolics, polymers, pitches, sugars and other chemistries that stick the particles together but tend to expand and lead to higher than desirable surface areas for the resultant particles. Furthermore, there can be problems of strength since a particulate may be pressed during use. Such pressing can crush the agglomerated particle, leading to relaxation expansion and other problems.

Historically, the other method that has been used to control the size and shape of carbon/graphite particles has been to make meso-phase spheres, extract the remaining pitch, and isolate these spheres before stabilization, carbonization and graphitization. These spheres naturally develop during pitch cooking. These meso-phase spheres are partially oxidized so are more resistant to oxidation and melting as well as being less soluble than the surrounding pitch. In effect, their structure is fixed and melting is inhibited. The art of making this kind of rounded particle is known in the patent literature (EP0456278B1, EP1296892A4, U.S. Pat. Nos. 4,045,368, 4,273,675 etc.). These techniques are also reviewed in a number of Journal articles and dissertations (Zhou, Changjun. 2007. The effect of additives and processing conditions on properties of sintered mesocarbon microbeads. Dissertation Notre Dame, Ind.; Norfolk, C. et al. 2004. Carbon 42(1):11-19; Chang, Y. et al. 1999. Carbon 37(8):1285-1297; Korai, Y. et al. 1997. Carbon 35(10-11): 1503-1515; Wang. Y. et al., 1999. Carbon 37(2):307-314; Park, S. H. 2001. Carbon 2(2):99-104).

Most art has concentrated on growing the proper sized spheres by suitable cooking and solvent/solute choice followed by extraction of the un-oxidized pitch whereby the pitch particles can be isolated for further oxidation and stabilization. When this is done, often this causes the particles to have a higher surface area due to the development of porosity.

The yields of round carbon powders of the correct size using meso-phase spheres according to these methods have been too low causing the price of these products to be very expensive because of low yields of the proper sized particle and high solvent and processing costs.

A second known method to produce rounded particles is by extrusion of pitch or suitable carbonizable material through a die, cutting it to lengths, and cooling the cut yet molten particle after it has time to sphericalize (U.S. Pat. Nos. 4,371,454, 7,781,370). Such a process is expensive and difficult to apply to very small particle sizes.

There have been many attempts to also make spherical carbon particles by molding or dispersion. These have been the subject of many patents as well (U.S. Pat. Nos. 3,909, 449; 3,953,345; 4,025,689; US Appl. 2010/0311852A1; US Appl. 2012/0286216A1; EP1743870A1). These techniques can allow a wide variety of particles to be made from nanometer to millimeter sized. However, these methods are expensive and lead to particles of varied sizes, planes of orientation, surface properties and catalytic activities. The improperly sized particles are difficult to utilize and cannot be recycled.

It has also been proposed to make aerogels as a means to manufacture round carbon particles (U.S. Pat. No. 5,898, 564).

SUMMARY OF THE INVENTION

The inventors have realized that by rounding a carbon precursor of appropriate particle size distribution, such that when carbonized it achieves a desired carbon particle size distribution, much waste is avoided.

Accordingly, the present invention comprises a method for producing carbon powder having a defined carbon particle size distribution comprising the steps of:—
a) selecting a carbon precursor powder of a defined precursor particle size distribution, the carbon precursor powder consisting of or comprising particles of a meltable carbon precursor;
b) treating the carbon precursor powder to round at least some of the particles of the carbon precursor and thereby produce a rounded carbon precursor; and
c) carbonizing the rounded carbon precursor;
wherein the defined precursor particle size distribution is such that on carbonization the powder of defined carbon particle size distribution is produced.

The step of providing a carbon precursor powder of a defined precursor particle size distribution may, for example, comprise the steps of:—
a) providing a first carbon precursor powder of a first defined particle size distribution; and
b) selecting from the carbon precursor powder, particles of a second size distribution narrower than the first particle size distribution to produce the carbon precursor powder of a defined precursor particle size distribution.
and may for example comprise sieving the first carbon precursor powder.

The step of providing a carbon precursor powder of a first defined particle size distribution may comprise milling an initial carbon precursor powder.

The step of treating the sized carbon precursor powder to round at least some of the particles may, for example, comprise one or more steps selected from the group:—
milling under gentle conditions;
at least partially melting the particles of a meltable carbon precursor.

The step of treating the carbon precursor powder to round at least some of the particles may, for example, include a step in which the carbon precursor powder is suspended in a fluid. This step may comprise wet abrasive sphericalization.

The produced carbon particles or rounded carbon precursor particles preferably have an aspect ratio of less than 2.0; or less than 1.8; or less than 1.6; or less than 1.4; or less than 1.2; or less than 1.1.

The rounding process preferably decreases the aspect ratio of the carbon particles or carbon precursor particles by at least 20%; or at least 40%; or at least 60%; or at least 80%.

The present disclosure is further set out in the claims, and further described by way of example only in the following non-limitative description and with reference to the drawings in which:—

Figure 2:
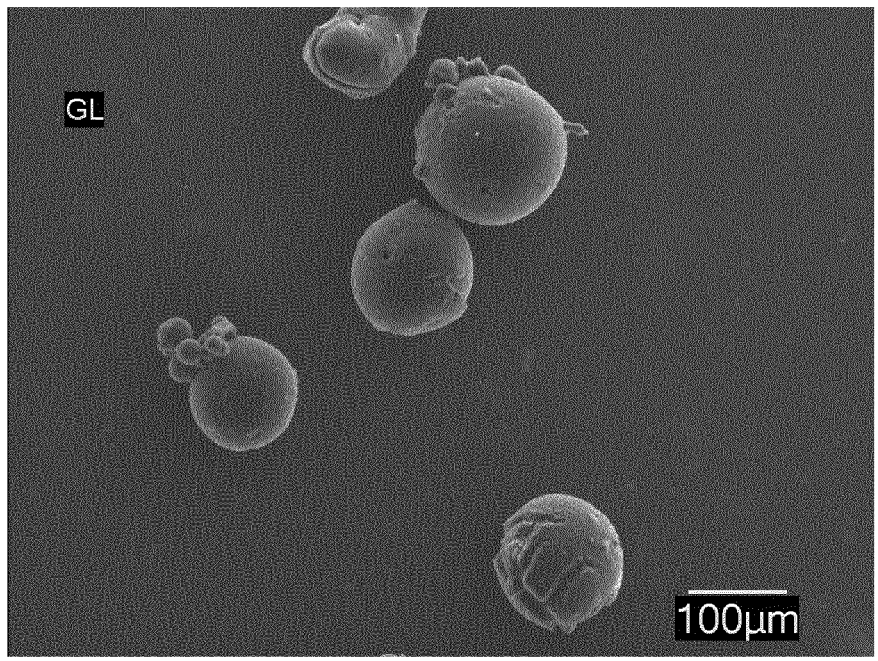
Figure 3:
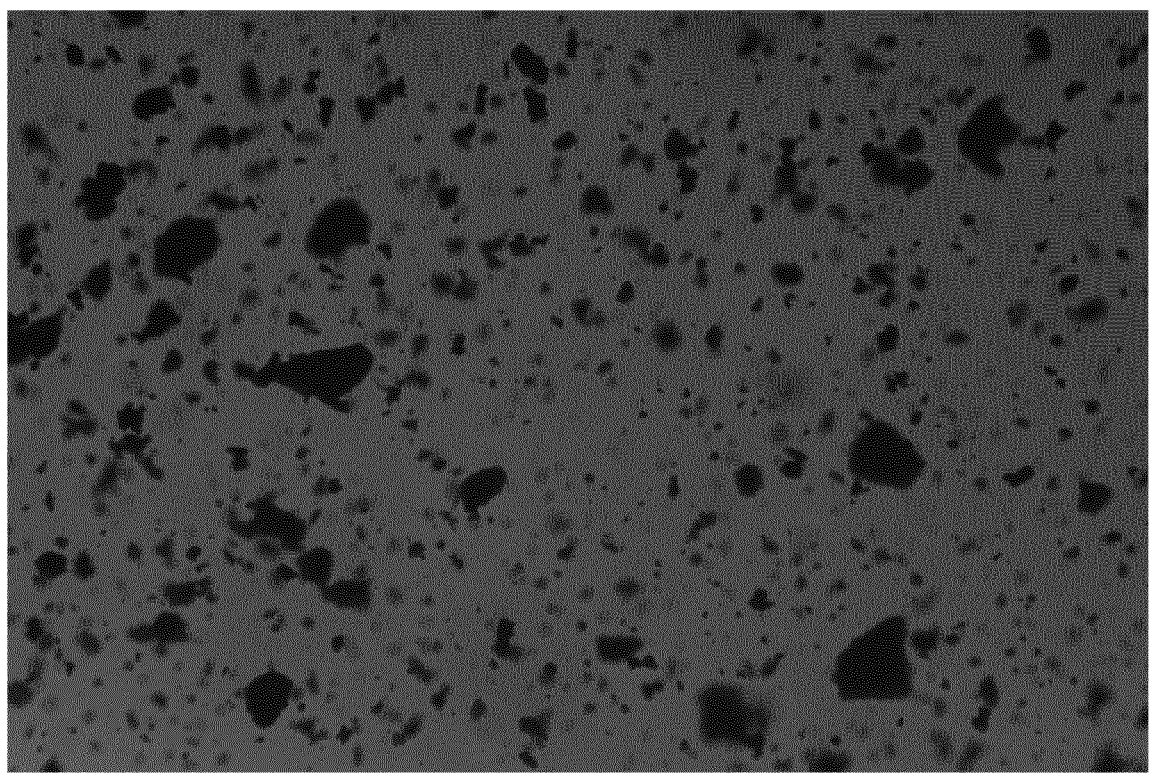
Figure 4:
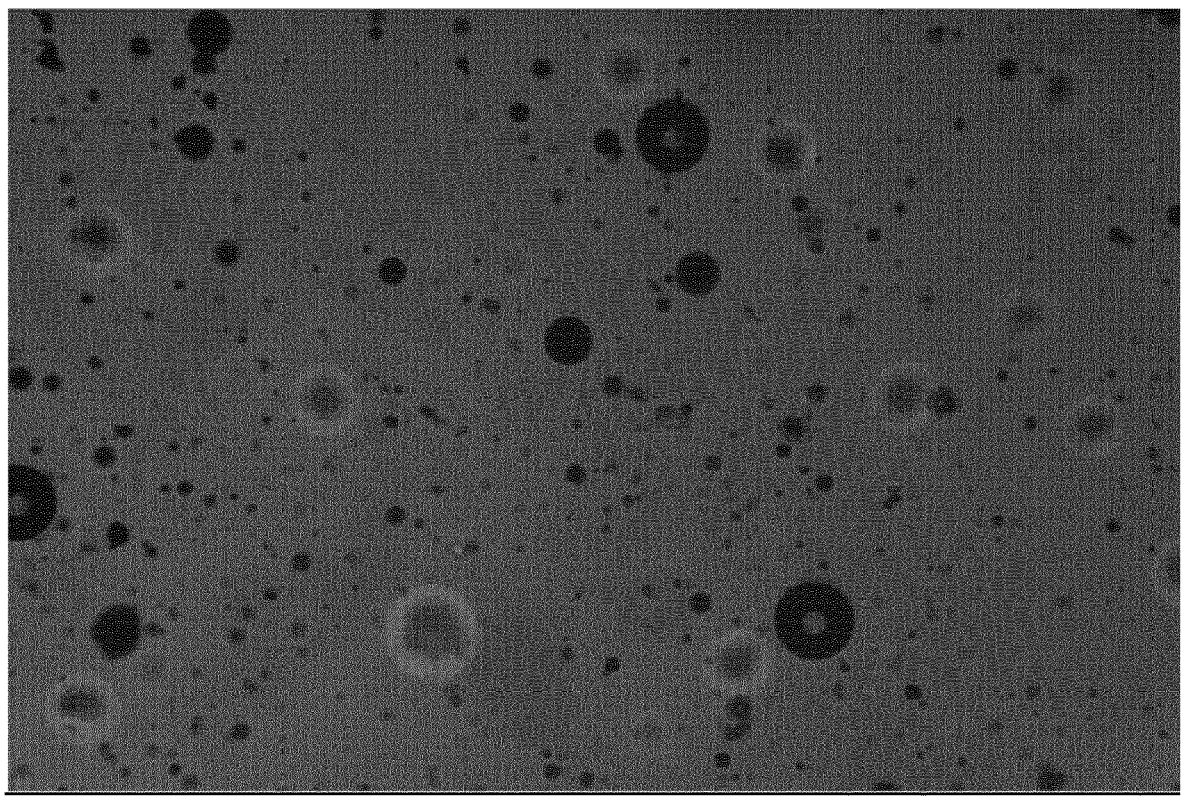

FIG. 1 discloses a flow chart for a method in accordance with a non-limiting embodiment of the invention FIG. 2 shows a sphericalized carbon made by rounding in accordance with the present invention FIG. 3 shows a nonsphericalized carbon FIG. 4 shows a sphericalized carbon made by rounding in glycerol in accordance with an embodiment of the present invention In FIG. 1 a process is generalized for producing sized and rounded carbon/graphite. In the process shown a carbon precursor 1 is selected which passes to a preparation step 2 where it may be crushed and mixed with optional ingredients and reworked material as described below. The carbon precursor then moves to a milling step 3, and sieving step 4, to provide a carbon precursor powder of defined carbon precursor particle size distribution. Particles that do not fall within the defined carbon precursor particle size distribution are passed back to be reworked in preparation step 2 as further discussed below.

Particles that do fall within the defined carbon precursor particle size distribution pass on to a rounding step 5 and from there to a further sieving step 6. Particles that do not fall within the defined carbon precursor particle size distribution are passed back to preparation step 2 where they are re-melted and crushed.

Particles that do fall within the defined carbon precursor particle size distribution pass on to a stabilization step 7 and from there to a carbonization step 8.

An optional graphitization step 9 may be provided.

Carbonized or graphitized particles pass to a final sieving step 10. Carbonized or graphitized particles that meet the desired carbon particle size distribution (which may be the same or different from the defined carbon precursor particle size distribution as described below) pass on to 11 as the final product which may be used as is, or blended with other materials, as required.

Carbonized or graphitized particles that meet the desired carbon particle size distribution may be reworked [e.g. by milling and sieving] at step 12 and passed on to the preparation step 2 to be incorporated into the precursor powder of meltable ingredients.

Optional ingredients 13 can be incorporated at the preparation step and optional ingredients 14 can be incorporated at the stabilization or carbonization steps.

Several of these steps are optional according to the nature of the raw materials used and the products sought, and further detail is provided below.

Formulation of carbon precursors. A typical process to the invention would start by selecting a carbon precursor powder of defined precursor particle size distribution. The carbon precursor powder of defined precursor particle size distribution may be a purchased product of appropriate size distribution, but typically one would start with a purchased product that would be milled and sieved (milling step 3 and sieving step 4).

The carbon precursor powder comprises one or more meltable carbon precursors [for example a pitch or a polymer]. Meltable carbon precursors can be re-melted and additional elements added. While many polymers and other materials can be used as precursors, generally pitch is the least expensive meltable precursor. As discussed below, the carbon precursor powder may also include non-meltable components, for example non-meltable precursors and carbon powders. Reworked carbon may be incorporated back into the mix.

Pitches from coal or petroleum can be employed and they can vary from being liquid at room temperature to melting at greater than 350° C. A pitch that is a solid at room temperature (for example with a melting point above 30° C. or above 50° C.) is preferable as it can be milled without special cooling. While refined pitches can be used, isotropic and mesophase pitches are convenient. While unmodified pitches are generally used, for some products pitches with naphthalene and anthracene may be used. Preferred pitches would include milled and sized pitches with a melting point between 110 and 300° C. Most of the pitches with a softening point in the range of 230-280° C. would be considered mesophase.

Optional ingredients 13 may be added at this stage. Metal and compounds of boron, aluminum, titanium, vanadium, manganese, iron, nickel, silicon, silicon carbide, and other silicon compounds that release silicon on firing are examples of materials that catalyze graphitization. The preferred additives would include one or more of aluminum, boron, silicon, tin or titanium in elemental or combined form. Hydrogen fluoride and boron trifluoride (which can also be recovered) has also been used as a graphitization catalyst. Suitable additions of graphitization catalyzing materials can be used to manufacture a material which is a tailored hybrid hard carbon and graphitic carbon with the benefits of both in terms of voltage profile and enhanced reversible capacity compared to a pure graphite material and a reduced irreversible capacity compared to a hard carbon material as the active material in a lithium ion battery. There will be analogous performance benefits within similar batteries such as sodium ion and magnesium ion. Other additives are also helpful to increase performance of the carbon/graphite catalytic surfaces, for example, aluminum chloride added as a catalyst, carbon black, graphite powder, copper or copper salts (for increased capacity), silver and silver salts, tin, antimony, and silicon. Some of these additives will also increase the reversible capacity of the material when used as an anode material in a lithium-ion battery, sodium-ion battery or magnesium-ion battery. The optimal material will be dependent upon the eventual use of the carbon/graphite and is not limited to this list.

To change the properties of the materials as they are stabilized, phenolic resins, esters, furfural, naphthalenes and many other ingredients may be blended with the pitch. Some of these may need to be extracted after the spherialization and affect the surface area of the final product.

Rework of preformed graphite or other carbons may be incorporated into the pitch. These particulates should preferably be at least 5 times less than the preferred final size of the particle. This can produce mixed orientations that can raise the catalytic activity by forming a plurality of surfaces and pore structures into the material. The interfaces of these different surfaces can also become areas of heightened activity.

Recently the addition of nanomaterials and structures such as nanomaterials based upon carbon and other elements have been found to contribute improved properties to carbons. Graphene sheets are one such nanomaterial that can be added to the precursors to improve the surface properties. Further, sulfur, sulfonic acids and a plurality of other ingredients may act as a processing aid and affect the final physical and chemical properties. [For example the chemicals listed in U.S. Pat. No. 5,607,770 cross-link a pitch to make a hard carbon].

Non-meltable carbon precursors [e.g. of cellulose] may also be included in the carbon precursor.

Sizing the carbon precursors. As described above, particulates of the right size range may be prepared by milling and sieving a pitch or other material that carbonizes to a usable precursor with a reasonable carbon yield. Unlike other methods for making spherialized particles, the invention starts with appropriately sized carbon precursor particles which may be produced by sieving and other appropriate size separation methodologies [e.g. jet sieving or any other suitable method].

Out of specification meltable carbon precursor particles can be melted and re-milled if the particles are of the incorrect size. This makes it possible first to get a very high yield of particles of the correct size range. Once particles of the correct size range are obtained, they can be spherialized or rounded using gentle milling equipment and out of specification fines re-melted and reused. Alternately, they can be spherialized in solution or by other suitable means including wet spherialization.

Non-meltable carbon precursors do not have this advantage, but out of specification particles can be re-used as a feedstock in combination with meltable precursors.

Spherialization of base particles. Such a sized meltable carbon precursor particle can be further processed in one of two main ways. The starting particle can be rounded in solution or dry-milled or wet milled to spherialize it before it is stabilized. The fines from milling that are smaller than the size range can be melted and re-milled since the pitch still melts easily. For wet milling, the slurry of particles may be put into a solution and pumped. The process of pumping can cause the rounding of the particles over time. This is also aided by proper in-line mixing whereby the particles are impinged on a hard surface or against each other. A pin mill or emulsifying mill is particularly useful for this purpose. A paddle mill or mill with variable speed is useful for dry milling. There are a number of different mills that have been found useful for this step.

Alternatively, the particles may be sphericalized in solution. This is typically done by suspending the particles in solution with mixing and heating to just below the melt temperature so that the particles will round. If the particles are heated too much or for too long, the particles will agglomerate into an unusable mass. If the particles are not heated for long enough or without agitation, then they will not become spherical. The conditions to apply will vary according to the nature of the precursor.

Rounding in solution relies on picking the correct solvent system. The pitch and the solvent need to be matched. Ideally the solvent should be viscous enough to help keep the particles apart.

While a very slight pitch solubility helps to keep the pitch from coalescing, preferably the solvent system does not boil close to the temperature used to round the particles. The concentration of the particles in the solution should preferably be low (for example in the range of 0.5-2 wt %, for example 1%). If the particles are too concentrated in the solution, they have a tendency to coalesce.

There is a time temperature relationship between rounding and causing clumping that depends upon the specific characteristics of the pitch or polymer being rounded. The particles are preferably dispersed with agitation since the particles may settle or come to the surface of the liquid and agglomerate during this process.

Addition of non-meltable materials, for example carbon blacks, rework, graphite and other very small particles, can help keep the precursor from agglomerating as it melts and rounds. Such a process can produce a carbon comprising a shell structure with a surface having a higher degree of graphitization than the core, or a non-graphitic shell with more graphitized regions inside. It is possible that this process provides distinctive catalytic properties, but this is not proven yet A number of solvents have been considered. Water is of course the most desired solvent for both price and environmental impact.

However, it is not useful except for sphericalization of particles of with a low melting point of 80° C. or less. Once the solvent gets close to its boiling point the solvent properties change and agglomeration tends to increase. When water is used, a surfactant like Tween 80, Tween 20, Triton X-100 or polysorbate 80 is helpful. Particularly helpful is the use of Organosilicon surfactants like Silwet 77.

For higher melting point pitches, the use of glycerol has proven successful. It is soluble in water and can be easily washed off. Since it has a high viscosity, particles do not agglomerate as much as in water. Typically, glycerol is used at 40° C. to 5° C. below the melting point. If we heat to 3-5° C. below the melting point, the reaction must be quenched quickly as agglomeration is more of a problem. Quenching may be accomplished by adding cool solvent to lower the temperature quickly and cause the pitch particles to harden. Once the cooled pitch has been cooled, it can be filtered using a sieve and most of the glycerol reused.

The glycerol laden particulates can be water washed if it is not desirable to distill the solvents and reuse.

Other polyols, acids and alcohols can be added to the glycerol to initially wash most of the glycerol off and vacuum distilled off at lower temperature. Alternatively, water can be used to thoroughly wash the product.

The preferred solvents that work include but are not limited to the following chemical classes:—alcohols, organic acids, polyols, water, glycerol, zwitterionic compounds, amines, polymeric liquids (including liquids comprising thickeners such as xanthan, algin, guar, surfactants, bulking agents, etc).

Each pitch and precursor is different. It is critical to pick a solvent that is not appreciably dissolved with the pitch selected. Secondly the solvent should be somewhat viscous and should have a boiling point at least 20° C. and preferably 40° C. higher than the temperature of rounding. If there is some agglomeration a moderately high shear mixer can break the agglomerates so the rounded pitch particles can be re-isolated. However, if the reaction is heated for too long at too high a temperature, the pitch will be totally agglomerated and must be re-melted and milled as rework.

An alternative way making sized and rounded particles that can be re-melted/recycled if not of correct size involves spraying, either of molten carbon precursor or of a solution of carbon precursor in a solvent.

A spray-drier may be used as well as a fluidized bed or tower to make spray formed particulates of the proper size. In this embodiment, the pitch or other meltable precursor is prepared and sprayed through a nozzle/die. Before the particulates touch, they are both solidified and rounded into a particle. These particles, similarly to milled and rounded particles, are size classified to remove particles that are too large or too small. Particles with the correct size will be stabilized. Particles outside of the desired range will be recycled through re-melting to eliminate waste. Through this route separate milling steps may be avoided.

Stabilization is being defined for the purpose of this application as being a process whereby a pitch or other precursor can be chemically modified so that it will not re-melt as carbonized. Some skilled in the field refer to this as thermosetting.

The purpose of this step is well known and practiced in the manufacture of pitch fibers before carbonization into carbon. This can lock in the propensity to form graphite.

Oxygen or other substituents attached to the precursor particle inhibit melting and make possible heating and conversion of the stabilized hydrocarbon into carbon.

During this step, the temperature is controlled so there is no melting before the particles are oxidized and infused. There are many compounds that are well known to do this and include peroxides, persulfates, pyrosulfates, perchlorates, sulfates, sulfites, sulfur, bisulfates, bisulfites, sulfamates and nitrates. Especially popular processes include the use of nitric acid, sulfuric acid, air, hydrogen peroxide, nitrous oxide, and ozone due to their low cost.

For the stabilization of lower melting point rounded particles, nitric acid followed by air oxidation is recommended. However, for higher melting point precursors, air or nitric acid is usually preferred.

If this step is not completed adequately, the product will stick together and congeal into a mass. If this is properly done, the product will not stick at all or only very slightly. U.S. Pat. No. 4,275,051 and many other references explain this process.

In stabilizing with air, it is useful to agitate or insure that the air uniformly contacts all parts of the particle. Otherwise, the prerequisite oxidation will not be able to occur. This can cause sticking or congealing of the particles.

Therefore, the usual method of air or ozone stabilization consists of agitating the particles by tumbling, fluidized sparging, or uplift column of gas. A preferred method is a slow agitation such as a tumbler heater or rotary calciner.

For the air oxidation, the temperature should preferably be from 170° C. to 250° C. For example, this can be done by holding the temperature at 170° C. for up to 40 hr; or to increase the temperature from 170° C. to 250° C. at 10° C./hr.

When employing nitric acid oxidation, the concentration and time depend upon the precursor pitch or other meltable precursor. Times and temperatures can vary, but an oxidation temperature of room temperature or below is preferred. To lower the oxidation extent to what is critical to carbonization steps to follow, a lower concentration of nitric acid is preferred with a short time. More preferred is a temperature of room temperature using 10-30% nitric acid in solution for 5-15 minutes, depending upon the characteristics of the starting pitch. This results in a preferred product with a lower surface area for lithium ion battery applications. For catalytic applications where a higher surface area is desired, higher concentrations of nitric acid for a longer time and higher temperatures can be utilized than for lithium ion Battery applications. Of course, adding catalysts can lower the required nitric acid level to achieve the same degree of oxidation. These catalysts are well known to the art and can include strong Lewis acids or acids such as sulfuric acid, hydrochloric acid, phosphoric acid, sulfonic acids, etc.

In some cases, the oxidation can be followed with carbonization in the same vessel. In other cases where the carbon is hydrated during stabilization, the product is desirably dried, or at least most of the moisture removed, before carbonization. Heating with multiple sections for drying can allow the drying and carbonization step to be done in one piece of equipment. The nature and degree of stabilization required will vary from precursor to precursor.

Multiple stabilization steps may be necessary to ensure the particle does not agglomerate during further processing. This may mean that low melting point pitches may need to be stabilized by two different methods such as nitric acid followed by air oxidation. The invention encompasses any well known or future developed chemistry that converts the precursor to a particle that resists melting during the carbonization step.

Carbonization. Carbonization requires heating to a temperature that will convert the carbon precursor to carbon. Typically this consists of heating to a temperature of between 600 and 1200° C. depending upon the properties desired. To minimize surface area, it may be desirable to heat to as much as 1700° C., if a separate graphitization step is not required.

During this process, it is possible to quickly heat the material to the temperature that it saw during the stabilization. Typically, the product may be either put in a saggar or nitrogen purged to prevent air oxidation during carbonization. The rate of temperature increase will greatly affect the density and surface area. For general properties, a ramp rate of 20° C./hr. will be used between 170° C. and 400° C. For a particle with a lower surface area, a slower ramp rate of 5-10° C./hr is advantageous. For less dense and higher surface area products, a ramp rate of 20-50° C./hr may be used. Once at 400° C., generally a ramp rate of 50° C./hr can be used up to 600-1300° C. For many applications the carbonized powder is sufficient.

Particles that are too large (e.g. through agglomeration) or too small (e.g. through mechanical damage) after carbonization can be milled and incorporated into the pitch as rework.

Some particles such as made from natural polymers like cellulose powders as well as thermoset plastics can be directly rounded and carbonized in the same step. In the case of cellulose, they can be carbonized with agitation by directly heating in mineral oil, glycerol, silicone oil and other high boiling point solvents/solutions. If this is done with agitation, the resultant particulates will be rounded and carbonized at the same time.

Post Carbonization steps. Once the carbon powder is made, there are a number of possible modifications that may be done to introduce structure and functionality to the carbon material. For some catalytic uses, materials can be infiltrated to densify the product, or coated on the product. These coatings can comprise, for example, pitches and other materials such as polymers, sugars, esters etc.

Another process that may be applied to the carbon is activation, whereby pores and areas of catalytic activity are introduced. The normal activation reactions are done using air, carbon dioxide, steam, potassium hydroxide, and sodium hydroxide. Many chemicals can lead to activation, including improper admission of air to the product.

Additionally, the carbons may be purified using halogen purification or washing with acids and other chemicals.

Optional Graphitization/purification. Graphitization has a great effect on many characteristics of the powder. Most importantly, graphitization can lower the surface area of these powders from 2-500 $m^2/g$ to less than 1 $m^2/g$. This heating step can also increase the press density, although it usually will not greatly affect the tap density for rounded particles.

Additionally, heating to graphitizing temperatures often removes much of the $1^{st}$ cycle loss of capacity. These characteristics are very important to their use in some applications such as in lithium ion battery anodes. This step can also lower contaminants as many elements will sublime during graphitization at temperatures up to 3200° C. The specific maximum graphitization temperature can greatly affect properties, but can add cost to the product.

EXAMPLES

Example 1

Glycerol Sphericalization

In this example, 110° C. softening point coal pitch particles that were pre-sized between 400 and 500 mesh were heated in glycerol to between 50° C. and 60° C. while being agitated at 300 RPM using a stirrer. No sphericalization was found when the product reached 50° C. See FIG. 3.

At 60° C., the particles were well sphericalized and the rounding was quenched by adding 50% glycerol at 20° C. [See FIG. 4].

The bulk of particles produced were also between 400 and 500 mesh. However, some small particles as well as a few larger agglomerated particles were then removed by sieving to provide a sized powder of rounded carbon precursor.

It is critical that enough agitation be used to prevent the particles from agglomerating, but the degree of agitation required will vary from material to material.

This product was strained through a 200 mesh screen and then washed with water. The product was then stabilized using concentrated nitric acid diluted to 50%. The product was kept at room temperature overnight in the nitric acid. The next day, the temperature was raised 30° C./hr. with stirring till it reached boiling and kept at boiling for 10 minutes. The product was strained, washed with water, and dried at 120° C. for 3 hrs. The product was put into a sager and heated at 20° C./minute to a temperature of 400° C. and then heated at 50° C./minute to a temperature of 1000° C. The product was then cooled and removed from the sagger.

This sample was spherical as in FIG. 2 and could be used as is or processed through graphitization temperatures.

Example 2

110° C. mp pitch (1% pitch (200-300 mesh) in glycerol) was agitated at 300 RPM using a stirrer. We did not find any sphericalization at 80° C. The sphericalization started at 100° C. and the reaction was quenched by adding 50% glycerol that was at 20° C. to harden the particles. (This reaction is time and temperature dependent since we could sphericalize the product at 80° C. by holding the temperature for 10 minutes.) This product was strained through a 200 mesh screen and then washed with water. The product was then stabilized using concentrated nitric acid diluted to 50%. The product was kept at room temperature overnight in the nitric acid. The next day, the temperature was raised 30° C./hr. with stirring till it reached boiling and kept at boiling for 10 minutes. The product was strained, washed with water, and dried at 120° C. for 3 hrs. To air oxidize the material further, the material was air oxidized at 170° C. for 40 hr. The product was put into a saggar and heated at 20° C./minute to a temperature of 400° C. and then heated at 50° C./minute to a temperature of 1000° C. The product was then cooled and removed from the saggar. The sample particles produced were was spherical as in FIG. 2 and could be used as is or processed through graphitization temperatures.

Example 3

A 240° C. mp pitch (1% pitch (100-200 mesh) in glycerol) was agitated at 300 RPM using a stirrer. No sphericalization was noted at 80° C. and was assessed after each 5° C. temperature rise microscopically up to 210° C. The sphericalization started at 220° C. and the reaction was quenched by adding 50% glycerol that was at 20° C. to harden the particles. (This reaction is time and temperature dependent since we could sphericalize the product at 80° C. by holding the temperature for 10 minutes.) This product was strained through a 200 mesh screen and then washed with water. The product was then stabilized using concentrated nitric acid diluted to 35%. The product was kept at room temperature overnight in the nitric acid. The next day, the temperature was raised 30° C./hr. with stirring till it reached boiling and kept at boiling for 10 minutes. The product was strained, washed with water, and dried at 120 C. for 3 hrs. To air oxidize the material further, we air oxidized the material at 170° C. for 40 hr. The product was put into a saggar and heated at 20° C./minute to a temperature of 400° C. and then heated at 50° C./minute to a temperature of 1000° C. The product was then cooled and removed from the saggar. This sample was spherical as in FIG. 2 and could be used as is or processed through graphitization temperatures.

Example 4

A 110° C. mp pitch (1% pitch (60-100 mesh) in formic acid) was agitated at 300 RPM using a stirrer. (Other organic acids and polyols were successfully similarly used). The sphericalization started at 100° C. and the reaction was quenched by adding 50% formic acid that was at 20° C. to harden the particles. (This reaction is time and temperature dependent since we could sphericalize the product at 80° C. by holding the temperature for 10 minutes or at a higher temperature holding only a minute.) This product was strained through a 200 mesh screen and then washed with water. The product was then stabilized using concentrated nitric acid diluted to 50%. The product was kept at room temperature overnight in the nitric acid. The next day, the temperature was raised 30° C./hr. with stirring till it reached boiling and kept at boiling for 10 minutes. The product strained, washed with water, and dried at 120° C. for 3 hrs. To air oxidize the material further, we air oxidized the material at 170° C. for 40 hr. The product was put into a saggar and heated at 20° C./minute to a temperature of 400° C. and then heated at 50° C./minute to a temperature of 1000° C. The product was then cooled and removed from the saggar. This sample was spherical as in FIG. 2 and could be used as is or processed through graphitization temperatures.

Example 5

A 240° C. mp pitch was milled and mechanically sphericalized. Off-sized particles were removed by sieving. The product was oxidized at room temperature for 15 minutes with mixing in 35% nitric acid. Time and temperature of oxidation is dependent upon the pitch. The nitric acid was removed by vacuum filtration (although another suitable method could have been used) and washed with water. The oxidized pitch was dried at 120° C. The product was put into a saggar and heated at 20° C./minute to a temperature of 400° C. and then heated at 50° C./minute to a temperature of 1000° C. The product was then cooled and removed from the saggar. This sample was spherical and could be used as is or processed through graphitization temperatures.

Example 6

We heated 250° C. MP pitch particles (100-200 mesh) in mineral oil (1% pitch in heavy mineral oil) agitated at 250 RPM. At 225° C., the pitch particles sphericalized over 5 minutes. The reaction was quenched by adding 50% mineral oil at 20° C. with continued stirring. After 20 minutes, the stirring was turned off and the product was strained through a 200 mesh screen and washed with hexane. The hexane was removed by filtering and the rounded pitch was dried at 120° C. for 4 hr. The dried pitch was air oxidized at 170° C. for 40 hr with agitation. At the end of this time the product was put into a saggar and heated at 20° C./minute to a temperature of 400° C. and then heated at 50° C./minute to a temperature of 1000° C. The product was then cooled and removed from the saggar. This sample was spherical as in FIG. 2 and could be used as is or processed through graphitization temperatures.

Example 7

250° C. MP pitch particles (200-300 mesh) were directly air oxidized at 170° C. for 40 hr. with agitation. At the end of this time the product was put into a saggar and heated at 20° C./minute to a temperature of 400° C. and then heated at 50° C./minute to a temperature of 1000° C. The product was then cooled and removed from the sagger. This sample was spherical as in FIG. 2 and could be used as is or processed through graphitization temperatures.

Example 8

It was possible to use both abrasively rounded and rough ground particles that were sieved without rounding as a starting material for rounding. We found that a variety of dry mixing methods slowly rounded the particles. Dry sphericalization is well known within the carbon industry and can be accomplished with a paddle mixer, air abrasion methods, and even dry mills where the speed and feed rate can be closely controlled as well as the temperature to avoid heating. At the end of any rounding step, it was also necessary to re-sieve the material to remove the fines. The sample from dry rounding could be stabilized using a variety of stabilization schemes including simple air oxidation and carbonization as described in example 6.

Example 9

One could also use liquid abrasive rounding. In this method, the particles in solution are pumped or agitated for a long period of time. This can be done with a pump, homogenizer, stirrer, or pumping through an inline mixer or onto an impingement plate. By correctly setting the pressure, flow rates and shear, it is possible to round the particles. This method is useful especially where a liquid stabilization method such as nitric acid or sulfuric acid is employed subsequent to the rounding before carbonization. Ozone made from air can also be bubbled in solution to stabilize these pitch particles.

Example 10

Sized particles of pitch can be air stabilized and partially carbonized by spray or powder drying in a spray dryer. In this example, we introduced particles into the top of a fluidized lift spray dryer/fluidized drier with stabilization and partial carbonization in the same step. In this example 100 mesh particles of 110° C. MP pitch were introduced into the spray drier and were stabilized when collected. This process could round particles that melted, and if cellulose powder was introduced, rounding from the formation of pyrolysis products occurred.

Example 11

Sized particles of cellulose (100 mesh) at a concentration of 1% were put into mineral oil. During agitation at 200 RPM, the cellulose particles were rounded and partially carbonized within the mineral oil. This was done by raising the temperature to 300° C. at 40 C/hr. After the processing was concluded, the particles could be removed, dried by vacuum distillation or washed with a suitable solvent and subjected to a final carbonization process to make carbon powders of the correct size.

Target Distributions

Typical distributions of use in lithium ion battery anodes would be, for example, tight distributions centered on d50s of 15 μm and 20 μm. For example:—
For d50 of 15 μm, a suitable distribution would be d10 6 to 9 μm; d50 13 to 17 μm and d90<35 μm;
For d50 of 20, a suitable distribution would be d10 10 to 13 μm; d50 18 to 22 μm; d90<35 μm.
In summary, sphericalized (rounded) carbons having a variety of characteristics are desirable, in part because they because they pack correctly.

However, spherical carbons are difficult to make by other reported methods cheaply. This is not only because of the intrinsic cost of the raw feedstocks, but also the fact that most spherical carbons such as those made by mesophase sphere growth and separation cannot be manufactured within a tight size range which means they must be separated to size after they are made.

Mechanical sphericalization methods also are deficient since these also lead to poor yields of products with the desired size and shape.

To improve on these methods, the present invention starts with a precursor of defined particle size distribution that on carbonisation leads to a carbon powder of defined particle size distribution and that uses the precursor containing meltable precursor particles (e.g. of pitch or other meltable polymer/feedstock). The precursor is rounded before making the desired product.

An advantage to this technique is that improperly sized particles can be remelted and milled to form new feedstock. This recycling capability reduces the amount of product loss and increases production efficiencies.

The expensive steps of spherialization after milling a carbon or graphite will also be eliminated.

Some of these uses of carbon powders require the carbons to have high surface areas while others require very low total surface area but open catalytic surface whereby reactants and products can be translocated and reacted efficiently.

Routes and methods contemplated by the present invention may include:—
A method comprising:—
  mixing pitch & sulfur;
  cooling the mixture;
  milling & recycling to provide a high yield of properly sized particles (coarse particles sent back to the mill, fine particles re-melted, cooled, and sent back to the mill)
  sphericallizing and carbonizing in silicone oil or other high temperature liquid not acting as a solvent for the pitch.
A method comprising control porosity by controlling the rate of volatile release during carbonization. This may enable variation of the carbon between a dense or foamy structure.
Use of additives like silicon carbide (as mentioned above) mixed into the pitch as very fine particles so that if the carbonized particles were subjected to high temperatures, small highly graphitic regions could be developed within the hard carbon. This may result in a predominantly hard carbon particle with small highly graphitic regions.

The rounded carbon particles of defined size distribution of the present invention may be blended to provide further defined distributions. For example a carbon having a narrow but coarse defined size distribution may be blended with a carbon having a narrow but fine defined size distribution so that when packed the smaller particles of the latter may occupy gaps between the larger particles of the other.

Although the above has discussed suitability for lithium ion battery applications, other applications in which such carbons are of benefit include (without limitation):—
  supercapacitors;
  sodium-ion batteries;
  magnesium-ion batteries;
  fillers for fluoropolymers [e.g. PTFE].
In short, any application where carbon of controlled particle size distribution is required can benefit from the present invention.

The present disclosure includes the following numbered embodiments:
1. A method for producing carbon powder having a defined carbon particle size distribution comprising the steps of:
  a) selecting a carbon precursor powder of a defined precursor particle size distribution, the carbon precursor powder consisting of or comprising particles of one or more meltable carbon precursors;

b) treating the carbon precursor powder to round at least some of the particles of the carbon precursor and thereby produce a rounded carbon precursor; and c) carbonizing the rounded carbon precursor;

wherein the defined precursor particle size distribution is such that on carbonization the powder of defined carbon particle size distribution is produced.

2. A method as in embodiment 1, in which the step of providing a carbon precursor powder of a defined precursor particle size distribution comprises the steps of:— a) providing a first carbon precursor powder of a first defined particle size distribution; and b) selecting from the carbon precursor powder, particles of a second size distribution narrower than the first particle size distribution to produce the carbon precursor powder of a defined precursor particle size distribution.

3. A method as in embodiment 2, in which the step of selecting from the carbon precursor powder comprises sieving the first carbon precursor powder.

4. A method as in embodiment 2 or embodiment 3, in which the first carbon precursor powder comprises a spray formed powder.

5. A method as in any of embodiments 2 to 4, in which the step of providing a carbon precursor powder of a first defined particle size distribution comprises milling an initial carbon precursor powder.

6. A method as in any of embodiments 1 to 5, in which the step of treating the carbon precursor powder to round at least some of the particles comprises at least one step of milling under gentle conditions.

7. A method as in any of embodiments 1 to 6, in which the step of treating the carbon precursor powder to round at least some of the particles comprises at least one step of at least partially melting the particles of one or more meltable carbon precursors.

8. A method as in any of embodiments 1 to 7, in which the step of treating the carbon precursor powder to round at least some of the particles comprises at least one step of at least partially pyrolysing one or more particles of the carbon precursor powder.

9. A method as in any of embodiments 1 to 8, in which the step of treating the carbon precursor powder to round at least some of the particles includes at least one step in which the carbon precursor powder is heated while suspended in a fluid.

10. A method as in embodiment 9, in which the fluid is selected from one or more of water, glycerol, mineral oil, glycols, alcohols, silicone oils, and organic acids.

11. A method as in embodiment 9 or claim 10, in which the fluid comprises one or more surfactants and/or viscosity modifiers.

12. A method as in any of embodiments 9 to 11, in which temperatures of the fluid is in the range from 50° C. below the melting point to just below the melting point of the carbon precursor powder.

13. A method as in any of embodiments 9 to 12, in which agitation is used to maintain the carbon precursor in suspension in the fluid.

14. A method as in any of embodiments 1 to 13, in which the step of treating the carbon precursor powder to round at least some of the particles includes a step in which the carbon precursor powder is sprayed.

15. A method as in any of embodiments 1 to 14, in which the step of treating the carbon precursor powder to round at least some of the particles includes a step of wet abrasive sphericalization.

16. A method as in any of embodiments 2 to 15, in which particles falling outside the second size distribution narrower than the first particle size distribution are re-melted, and milled and used as part at least of the first carbon precursor powder.

17. A method as in any of embodiments 1 to 16, in which the one or more carbon precursor powder comprises one or more precursors selected from the group pitches, polymers, sugars, vinyl esters, polyacrylonitrile, polyethylene terephthalate, nylons (polyamides), polyethylene, polypropylene, polyvinyl chloride, polystyrene, polyurethane, furfural, naphthalenes, cellulose, cellulosics and rayon.

18. A method as in embodiment 17, in which one or more pitches are used, at least one pitch of which has a melting point of less than 350° C.

19. A method as in embodiment 18, in which at least one pitch has a melting point in the range 70 250° C.

20. A method as in any of embodiments 1 to 19, in which fine particulate materials are added to the carbon precursor powder.

21. A method as in embodiment 20, in which the fine particulate materials are added to the carbon precursor powder before or while treating the carbon precursor powder to round at least some of the particles of the carbon precursor, thereby reducing agglomeration of the carbon precursor.

22. A method as in embodiment 20 or embodiment 21, in which the fine particulate materials comprise a fraction of a powder produced by the method of any preceding claim having a size distribution less than the defined carbon particle size distribution.

23. A method as in any of embodiments 1 to 22, further comprising a step in which the rounded carbon precursor is stabilized prior to carbonizing to limit re-melting during carbonization.

24. A method as in embodiment 23, in which stabilization comprises at least one step of exposure to one or more of nitric acid, air, hydrogen peroxide, ozone, and sulfuric acid.

25. A method as in embodiment 23 or embodiment 24, in which two or more stabilization steps are used.

26. A method as in any of embodiments 1 to 25, in which subsequent to carbonization the carbonized particles undergo one or more steps of infiltrating, coating, or vacuum deposition prior to further carbonization and/or graphitization.

27. A method as in any of embodiments 1 to 26, comprising an additional step in which the carbon is activated to provide a high surface area and porosity.

28. A method as in any of embodiments 1 to 27, in which the carbonization step is or includes a graphitization step.

29. A method as in embodiment 1 to 28, in which the carbon precursor powder further comprises a graphitization catalyst.

30. A method as in embodiment 29, in which the graphitization catalyst comprises one or more of Boron, Aluminum, Titanium, Manganese, Iron, Nickel, Titanium and their chemical derivatives.

31. A method as in any of embodiments 1 to 30, in which the carbon precursor powder further comprises a catalytic component.

32. A method as in embodiment 31, in which the catalytic component comprises one or more of copper, silver, tin, antimony, silicon and their chemical derivatives.

33. A method as in any of embodiments 1 to 32, in which the carbon precursor powder further comprises one or more nanomaterials.

34. A method as in embodiment 33, in which the nanomaterials comprise one or more of nanoparticles, nanotubes, nanocarbon, graphene, graphene oxide, derivatised graphene, cellulose, elemental components, and clays.

35. A method as in any of embodiments 1 to 34, in which the carbon precursor powder further comprises one or more additives that affect the structure during the stabilization and/or the carbonization step.

36. A method as in embodiment 35, in which the one or more additives include one or more of phenolic resins, esters, furfural, naphthalenes, sulfur, sulfonic acids and organic catalysts.

37. A method as in embodiment 35 or embodiment 36, further comprising an extraction step to remove at least some of the one or more additives.

38. A method as in any of embodiments 1 to 37, in which at least one purification step is used subsequent to carbonization 39. A method as in embodiment 38, in which at least one of said at least one purification steps occurs subsequent to a graphitization step.

40. A method comprising the step of mixing two or more carbon powders having a defined carbon particle size distribution produced by the method of any of embodiments 1 to 39, to provide a carbon powder having a different defined carbon particle size distribution from the two or more carbon powders.

41. A method as in any of embodiments 1 to 40, in which the carbon powders having a defined carbon particle size distribution have a particle size distribution in which at least 95% by volume of the powder comprises particles having a mean maximum diameter in the range 5-50 μm with at least 90% of that powder having a maximum diameter within the range ±40% of the mean.

42. A method as in embodiment 41, in which the carbon powders having a defined carbon particle size distribution have a particle size distribution in which at least 95% by volume of the powder comprises particles having maximum diameters in the range 10-30 μm with at least 90% of that powder having a maximum diameter within the range ±40% of the mean.

43. A plant comprising one or more mills, one or more sieves, one or more furnaces, and one or more rounding apparatuses configured to effect the method of any of embodiments 1 to 42.

44. A material obtainable by the method of any of embodiments 1 to 42, which is a tailored hybrid of a non-graphitizable carbon (hard carbon) and a graphitic carbon material, made by incorporation of one or more graphitization catalysts into the carbon precursor.

45. A material as in embodiment 44, in which the graphitization catalyst comprises one or more of Boron, Aluminum, Titanium, Manganese, Iron, Nickel, Titanium and their chemical derivatives and compounds.

46. A material made obtainable by the method of any of embodiments 1 to 42 in which additives are incorporated to change the carbon/graphite catalytic surfaces and/or to increase the reversible capacity (versus pure graphite) of the material when used as an anode material in a lithium-ion battery, sodium-ion battery or magnesium-ion battery.

47. A material as in embodiment 46, in which the additives comprise one or more of aluminum chloride, carbon black, graphite powder, copper and copper salts, silver and silver salts, tin, antimony, and silicon and their chemical derivatives and compounds.

48. A material obtainable by the method of any of embodiments 1 to 42 in which the carbon precursor powder further comprises one or more nanomaterials.

49. A material as in embodiment 48, in which the nanomaterials comprise one or more of nanoparticles, nanotubes, nanocarbon, graphene, graphene oxide, derivatised graphene, cellulose, elemental components, and clays.

50. A material obtainable by the method of any of embodiments 1 to 42 in which the carbon precursor powder further comprises one or more additives that affect the structure during the stabilization and/or the carbonization step.

51. A material as in embodiment 50, in which the one or more additives include one or more of phenolic resins, esters, furfural, naphthalenes, sulfur, sulfonic acids and organic catalysts.

52. An electrochemical cell incorporating the material of any of embodiments 44 to 51.

The invention claimed is:

1. A method for producing carbon powder having a defined carbon particle size distribution comprising:
   a) providing a carbon precursor powder of a defined precursor particle size distribution by providing a first carbon precursor powder having a first defined particle size distribution, and selecting from the carbon precursor powder particles of a second particle size distribution narrower than the first defined particle size distribution to produce the carbon precursor powder of the defined precursor particle size distribution and in which particles falling outside the second particle size distribution narrower than the first defined particle size distribution are re-melted, and milled and used as part at least of the first carbon precursor powder, wherein the carbon precursor powder comprises particles of one or more meltable carbon precursors;
   b) treating the carbon precursor powder to round at least some of the particles of the carbon precursor powder to thereby have an aspect ratio of less than 2.0 and thereby produce a rounded carbon precursor; and
   c) carbonizing the rounded carbon precursor to provide carbonized particles, wherein the defined precursor particle size distribution is such that on carbonization, the powder having the defined carbon particle size distribution is produced.

2. A method as in claim 1, further comprising stabilizing the rounded carbon precursor prior to carbonizing to limit re-melting during carbonization.

3. A method as in claim 2, wherein the carbon precursor powder further comprises one or more additives that affect structure of the particles during stabilizing the rounded precursor and/or the carbonizing the rounded precursor.

4. A method as in claim 1, wherein subsequent to carbonizing the rounded precursor, the carbonized particles undergo one or more of infiltrating, coating, or vacuum deposition prior to heating to achieve further carbonization and/or graphitization.

5. A method as in claim 1, further comprising activating the carbon to provide a high surface area and porosity.

6. A method as in claim 1, wherein carbonizing the precursor includes graphitization.

7. A method as in claim 1, wherein treating the carbon precursor powder to round at least some of the particles comprises at least one step of at least partially melting the particles of one or more meltable carbon precursors.

8. A method as in claim 1, wherein treating the carbon precursor powder to round at least some of the particles comprises at least one step of at least partially pyrolysing one or more particles of the carbon precursor powder.

9. A method as in claim 1, wherein treating the carbon precursor powder to round at least some of the particles includes at least one step in which the carbon precursor powder is heated while suspended in a fluid.

10. A method as in claim 1, wherein particles falling outside the second particle size distribution narrower than the first particle size distribution are re-melted, milled and used as part at least of the first carbon precursor powder.

11. A method as in claim 1, wherein the carbon precursor powder further comprises a graphitization catalyst.

12. A method as in claim 11, wherein the graphitization catalyst comprises one or more of Boron, Aluminum, Titanium, Manganese, Iron, Nickel, Titanium and compounds thereof.

13. A method as in claim 1, wherein the carbon precursor powder further comprises a catalytic component.

14. A method as in claim 13, wherein the catalytic component comprises one or more of copper, silver, tin, antimony, silicon and compounds thereof.

* * * * *